(12) United States Patent
Richter et al.

(10) Patent No.: US 10,489,342 B2
(45) Date of Patent: Nov. 26, 2019

(54) INHERENT ARTIFICIAL INTELLIGENCE CONTACTLESS AND SELF-ORGANIZING SENSING CO-PROCESSOR SYSTEM INTERACTING WITH OBJECTS AND PERIPHERAL UNITS

(71) Applicants: Wolfgang Richter, Vancouver (CA); Faranak Zadeh, Vancouver (CA)

(72) Inventors: Wolfgang Richter, Vancouver (CA); Faranak Zadeh, Vancouver (CA)

(73) Assignee: EPIC Semiconductors INC, Vancouver (CA)

(*) Notice: Subject to any disclaimer, the term of this patent is extended or adjusted under 35 U.S.C. 154(b) by 768 days.

(21) Appl. No.: 15/226,533

(22) Filed: Aug. 2, 2016

(65) Prior Publication Data
US 2018/0039892 A1 Feb. 8, 2018

(51) Int. Cl.
*G06F 15/76* (2006.01)
*H04L 29/08* (2006.01)

(52) U.S. Cl.
CPC .............. *G06F 15/76* (2013.01); *H04L 67/10* (2013.01)

(58) Field of Classification Search
CPC .......... G06F 15/76; H04W 4/70; H04L 67/10; G06N 3/04; G06N 5/04; H02J 50/10; H02J 50/05

(Continued)

(56) References Cited

U.S. PATENT DOCUMENTS

| 2009/0067198 A1* | 3/2009 | Graham | H02J 7/025 363/8 |
|---|---|---|---|
| 2012/0004523 A1* | 1/2012 | Richter | A61B 5/0002 600/345 |

(Continued)

OTHER PUBLICATIONS

"The IoT nanoCloudProcessor is only the size of a speck of dust", Sep. 16, 2015. (Year: 2015).*

(Continued)

*Primary Examiner* — Dave Misir

(57) ABSTRACT

Disclosed is a contactless powered and operated self-organizing sensing co-processor system for interacting with an object and one or more peripheral units. The system communicates with a communicating device over a communication network. It includes a hub for providing a modulated alternating electric field with variable frequency and releases routing instructions and further communicates data with the communicating device and one or more nanoCloud processors, wherein at least one of the one or more nanoCloud processors interact with the object and the hub. The nanoCloud processor includes a coupling electrode, an energy convertor, a bi-directional communication unit, a pulser, a counter, plurality of registers, a hardware interpreter, a sequencing circuit, an analog digital switch matrix, and a floating electrode; wherein the hardware interpreter creates an inherent artificial intelligence relation to determine the changes on the object by analyzing combinations of the routing instructions and the value stored in the register with the change in the electric field level. Then, the hardware interpreter uses successive approximation to command the sequencing circuit on detecting the level and timing of dynamic changes in the electric charges on the object. The hardware interpreter sends the processed digital result to the bi-directional communication unit.

20 Claims, 12 Drawing Sheets

(58) Field of Classification Search
USPC .......................................................... 706/10
See application file for complete search history.

(56) References Cited

U.S. PATENT DOCUMENTS

| | | | |
|---|---|---|---|
| 2012/0112828 A1* | 5/2012 | Richter | H02J 50/05 |
| | | | 327/564 |
| 2014/0247152 A1* | 9/2014 | Proud | H04W 4/70 |
| | | | 340/870.07 |
| 2015/0180934 A1* | 6/2015 | Richter | G05B 19/102 |
| | | | 709/217 |
| 2016/0008602 A1* | 1/2016 | Perryman | H02J 50/20 |
| | | | 607/61 |
| 2016/0278639 A1* | 9/2016 | Proud | H04B 5/0037 |
| 2017/0063098 A1* | 3/2017 | Jeong | H02J 50/12 |

OTHER PUBLICATIONS

Sawan et al., "Wirelessly Powered and Bidirectional Data Exchanged in Smart Medical Microsystems", IEEE 2005 Custom Integrated Circuits Conference (Year: 2005).*

* cited by examiner

INHERENT ARTIFICIAL INTELLIGENCE CONTACTLESS AND SELF-ORGANIZING SENSING CO-PROCESSOR SYSTEM INTERACTING WITH OBJECTS AND PERIPHERAL UNITS

BACKGROUND OF THE INVENTION

1. Field of the Invention

The present invention relates to co-processors in self-organized intelligent sensing networks, and more particularly relates to an "inherent artificial intelligence" nano electronic chip, powered without direct contact and is self-organizing. Further, the nano electronic chip should be able to make decisions on external changes of any kind and operate in an intelligent way with specific parameters or variables.

2. Description of Related Art

The "Internet of Things" (IoT) and the newly upcoming "Array of Things" (AoT) require numerous, mostly wireless or contactlessly operating devices with integrated sensing or communication features. However, the use of such devices is restricted for certain purposes including cost, power, complexity, users' focus, and microwaves.

Many products or their packages require interactive digital support, which should be achieved by state of the art technologies, which is neither affordable nor profitable. Mobile, contactless, or wireless operating devices acquire electrical energy, which is normally provided by chemical batteries. These batteries force high investments into power management of the devices, and their controllers often spend most of their life-times in a so-called "sleep mode."

State of the art IoT devices consist of many separate components. The center is often built by MCU or SoC (system on chip), surrounded by peripherals like various sensors, MEMs, and communication sub-circuits, like Bluetooth or WiFi transceivers. The high integration of such parts, forces the need for multi-layer printed circuit boards and expensive precise assembling machinery. Testing of such devices and programming of their controllers is also a very complex process. Such a process generally requires a battery, radio-frequency waves, printed circuit board, bonding pads, and thus increases the cost and complexity of the system.

Users often have to use their mobile devices to activate the IoT features on external components. Near Field communication is popular where data and power is transmitted to so-called RFID via frequent magnetic means. While such action requires attention on operating a smart device, they take the user's focus away (from products). In fact, the users of the smart devices disrupt interactions in the real world as users get distracted.

Further, the number of sensors surrounding the modern world is calculated, not in billions, but in trillions. All of them have to be accessible from hubs, information clouds, or via the internet as networks. State of the art devices are using microwaves to communicate over the communication network.

A high amount of wireless sensing devices cause a large number of microwaves often in pulsed form of high destruction energy, which can harm many life forms, including beings from micro-organisms to plants to animals to even humans. Scientists continuously warn about the use of excessive microwaves.

There is a possibility of powering devices via alternating electric fields at a distance from a source, which have generated said fields. It is also known that electric charges appear on surfaces (including electrodes). Such charges mirror on other surfaces within reach. If the charges alternate, then the mirroring charge is also alternating. This creates an effect known as "capacitive coupling."

It has been known that the medium between an emitting and the mirroring electrode can be gas (air), liquid, or steady material (matter), which can be either conductive or non-conductive (dielectric). Changes in the medium have an effect of the mirroring field level that is used in the invention for sensing features.

With the advancement in technology in electronic circuits and human requirement, a need of artificial intelligence in the hardware has arisen. Artificial intelligence is termed as electronic circuitry that thinks and makes decisions based on external changes of any kind and operates in a smart way with the given parameters and variables.

However, a machine or device that understands the requirements of the user without requiring of programming has not been created yet. Therefore, in reference to the above mentioned issues, there is a need for a system that is contactlessly powered and operated via a self-organizing and sensing co-processor with an inherent artificial intelligence system. Further, the system should be able to connect multiple chips that are contactlessly self-powered and self-organized logic devices on a nano-scale.

SUMMARY OF THE INVENTION

In accordance with a preferred embodiment of the present invention, a contactless powered and operated self-organizing sensing co-processor system for interacting with an object and one or more peripheral units is being proposed.

The goal of this invention is to provide a contactlessly powered and operated self-organizing sensing co-processor system that includes a hub for providing a modulated alternating electric field with variable frequency and further releasing routing instructions and further communicates data with the communicating device and one or more nanoCloud processors, wherein at least one of the one or more nanoCloud processors interacts with the object and the hub.

The one or more nanoCloud processors includes a coupling electrode for receiving alternating electric field from the hub, an energy convertor for converting the alternating electric field into DC power and further extracting clock signals synchronized with the e-field frequency, and a bi-directional communication unit communicates results to the hub.

The one or more nanoCloud processors further includes a pulser to measure the field strength of the received charges from the energy convertor and generates pulsed intervals depending upon the field strength. It also includes a counter to count the periods of the receiving alternating charges between two pulses as quantitative measurement and further the counter counts the pulses during the number of continuous count as a qualitative measurement. The register further stores the amount of pulses during a certain amount of counts and the amount of counts between one pulse interval.

The nanoCloud processors also include multiple registers, where at least one of the register stores the corresponding count received from the counter. Additionally, the registers receive bit combination information from the hub and a hardware interpreter processes the bit combination information stored in the registers.

The nanoCloud processors also include a sequencing circuit (sequencer) that addresses a specific register on the conditions set by at least one of the hub, the pulser, the counter, or the hardware interpreter. An analog digital switch matrix receives routing instructions from the hub for making conditional temporary connections under the control of a hardware interpreter with at least one of the sub-circuits of nanoCloud processor, and the object, and a floating electrode, closes the circuit by capacitive coupling to the ground. There is also at least one external I/O controlled by the analog digital switch matrix to interact with at least one of the peripheral units.

The hardware interpreter creates an inherent artificial intelligence relation to determine the changes on the object by analyzing combinations of the routing instructions and the value stored in the register with the change in the electric field level. and further wherein the hardware interpreter uses successive approximation to command the sequencing circuit on detecting the level and timing of dynamic changes in the electric charges on the object, the hardware interpreter sends the processed digital result to the bi-directional communication unit.

Another aspect of the present invention is that it provides a compartment pit configured in the nanoCloud processor for accepting an object and analyzing at least one of its (bio-) chemical and physical changes item under the control of the hardware interpreter.

In another preferred embodiment of the present invention, the nanoCloud processor further includes a push electrode for providing shield to the floating electrode 102 to create a greater energy delta for the energy convertor. Further, the nanoCloud processor includes an analog buffer for operating a push electrode; and a switch unit to connect the push electrode to at least one of the analog buffer, and/or the circuit ground. Also can activate connected peripherals, e.g. when the nanoCloudProcessor loses power (out of reach of field)

Another aspect of the present invention is to provide the system wherein the hub further includes a generator for generating variable frequency; and at least one hub electrode for emitting alternating charges caused by the received frequency from the generator and further a nanoCloud processor mirrors the alternating charges with its coupling electrode.

Another aspect of the present invention is to provide the system wherein the coupling electrode of each nanoCloud processor in an array couples with each other over the object by mirroring the electric alternating charges received from the hub, further the electric alternating charges float back against earth over the floating electrode of at least one nanoCloud processor.

Another aspect of the present invention is to provide the system wherein the hardware interpreter of each nanoCloud processor allots an identification number based upon the distance from the hub electrode, and the register of each nanoCloud processor stores the identification number for determining the position of each nanoCloud processor from the hub.

Another aspect of the present invention is to provide the system wherein the hub further comprising a transceiver unit for communicating the results received from the nanoCloud processor to the communicating device, further the transceiver unit receives instructions from the communicating device to operate the one or more nanoCloud processors.

Another aspect of the present invention is to provide the system wherein the nanoCloud processor further comprising plurality of Schmitt triggers, wherein the first Schmitt-trigger creates a system clock synchronized with the received alternating electric charges for operating other sub-circuits of the nanoCloud processor; and the second Schmitt-trigger creates pulses from the field strength.

Another aspect of the present invention is to provide the system wherein the second Schmitt-trigger decodes data from the modulated electric field under the control of analog switch matrix for receiving the bit combination information from the hub. Further, the hardware interpreter processes the value and the trend of the electric field strength on the object.

Another aspect of the present invention is to provide the system wherein the system further includes a nano-coated material coating on the coupling electrode and the floating electrode for detecting and eliminating germs and pathogens, further the nano-coated material measures electro chemical reactions. Further in the system, the energy convertor connects to the counter, wherein the counter starts counting when the coupling electrode is out of reach of an electric field.

The system further includes a housing for stacking plurality of nanoCloud processors for creating a network of charged coupled device to sense physical and chemical changes.

Another aspect of the present invention is to provide the system including a hub and a microcontroller emulating a nanoCloud processor, wherein its hardware interpreter is replaced with the software interpreter for emulating a nanoCloud processor. The software interpreter creates programmed artificial intelligence relations to determine the changes on the object by analyzing combinations of the routing instructions and the value stored in the register with the change in the electric field level; and commands the sequencing circuit on detecting the level and timing of dynamic changes in the electric charges on the object, and the software interpreter sends the processed digital result to the bi-directional communication unit.

Further features and advantages of the present invention, as well as the structure and operation of various embodiments of the present invention, are described in detail below with reference to the accompanying drawings.

DETAILED DESCRIPTION OF DRAWINGS

Figure 1:
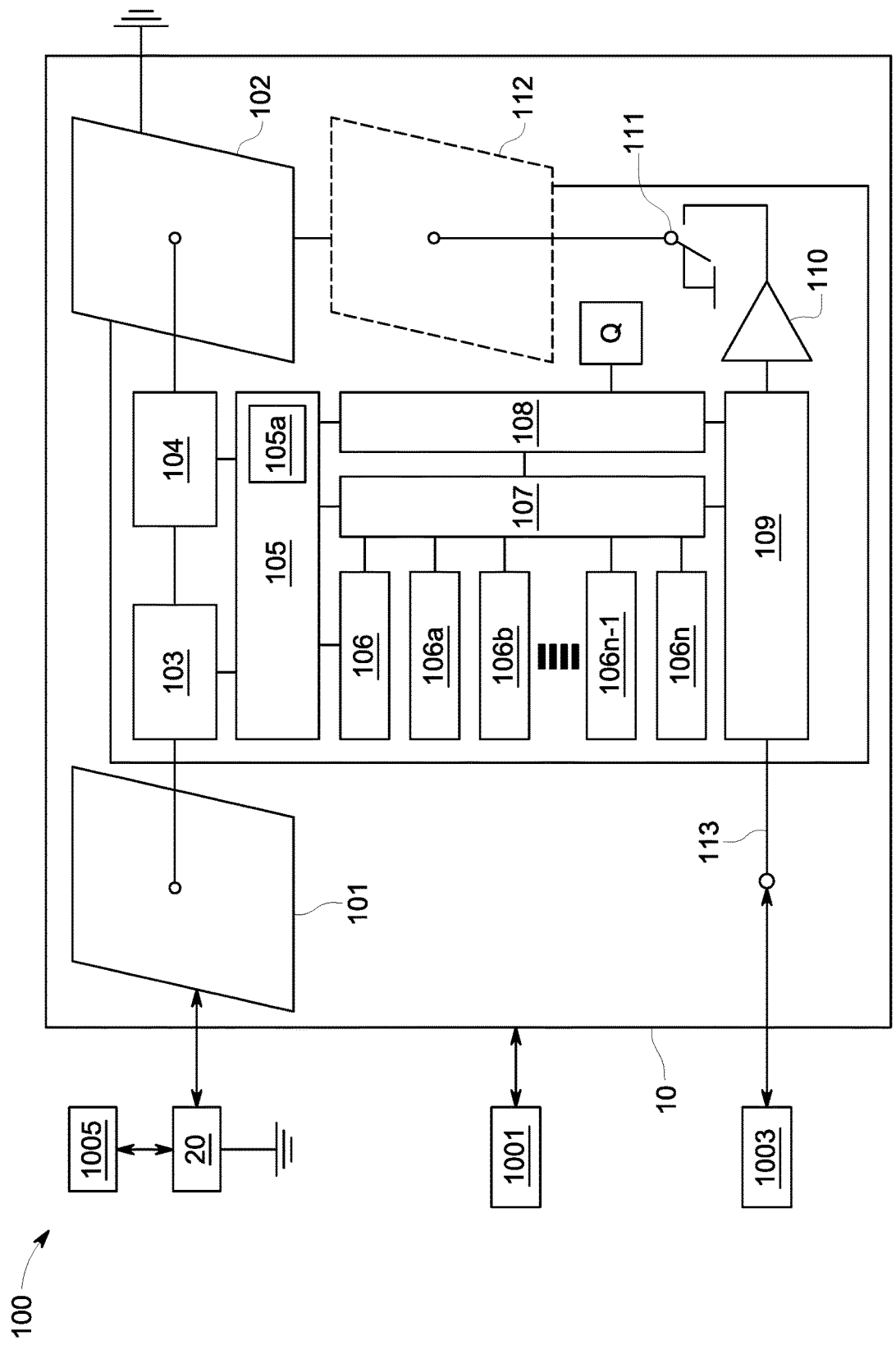
FIG. 1 illustrates a block diagram of a contactless powered and operated self-organizing sensing co-processor system for interacting with an object and one or more peripheral units, in accordance with a preferred embodiment of the present invention.

While this technology is illustrated and described in a preferred embodiment, a contactless powered and operated self-organizing sensing co-processor system for interacting with an object and one or more peripheral units may be produced in many different configurations, forms, and with various materials. This is depicted in the drawings and will be described in detail, as a preferred embodiment of the invention, with the understanding that the present disclosure is to be considered as an exemplification of the principles of the invention and the associated functional specifications for its construction. It is not intended to limit the invention to the embodiment illustrated. Those skilled in the art will envision many other possible variations within the scope of the technology described herein.

FIG. 1 illustrates a block diagram of a contactless powered and operated self-organizing sensing co-processor system 100 for interacting with an object 1001 and one or more peripheral unit 1003 in accordance with a preferred embodiment of the present invention. The system 100 further communicates with a communicating device 1005. The system 100 includes a hub 20 and one or more nanoCloud processor 10.

The hub 20 provides a modulated alternating electric field with variable frequency and releases routing instructions. It communicates data with the communicating device 1005. The hub 20 is explained in detail in conjunction with FIG. 2 to FIG. 6 of the present invention.

The nanoCloud processor 10 interacts with the object 1001 and the hub 20. The object 1001 is positioned between the hub 20 and the nanoCloud processor 10. The nanoCloud processor 10 includes a coupling electrode 101, an energy converter 103, a bi-directional communication unit 104, a pulser 105, a counter 105a, plurality of registers 106 such as 106a, 106b, 106n-1, 106n; a hardware interpreter 108, a sequencing circuit 107, an analog digital switch matrix 109, at least one external I/O 113, and a floating electrode 102.

The coupling electrode 101 receives alternating electric field from the hub 20. In a preferred embodiment of the present invention, the hub 20 couples with the nearest coupling electrode 101. The energy convertor 103 converts the alternating electric field into DC power and further extracting clock signals synchronized with the e-field frequency. In a preferred embodiment of the present invention, the energy convertor 103 rectifies the mirrored alternating charges and creates usable DC energy and further stores the DC energy in internal buffer.

The pulser 105 measures the field strength of the received charges from the energy convertor 103. The pulser 105 generates pulsed intervals depending upon the field strength. The counter 105a counts the periods of the receiving alternating charges between two pulses as quantitative measurement and further the counter 105a counts the pulses during number of continuous count as qualitative measurement.

In a preferred embodiment of the present invention, the generated pulse intervals may be either counted over a certain time period (quantitative) or used as a gate to a counter which counts the periods of the received alternating charges between two pulses (qualitative). The result in the above cases is a digital number that addresses directly to one of the registers 106.

The plurality of registers 106, such as 106a, 106b, 106n-1 and 106n, wherein at least one of the register 106 stores the corresponding count received from the counter 105a. The registers 106 receive the bit combination information from the hub 20. The hardware interpreter 108 processes the bit combination information stored in the registers 106.

The sequencing circuit 107, addresses a specific register on the conditions set either by the hub 20 or the pulser 105 or the counter 105a, or the hardware interpreter 108. In a preferred embodiment of the present invention, the registers 106 is either addressed by the result of the field measurement of the pulser 105 or from the sequencing circuit 107. The sequencing circuit 107 operates/handles a number of instructions/data/bit combinations in the register 106.

The analog digital switch matrix 109 receives routing instructions from the hub 20 for making conditional temporary connections under the control of hardware interpreter 108 with at least one of the sub-circuits of nanoCloud processor 10. In another preferred embodiment of the present invention, the nanoCloud processor 10 further includes an external I/O 113 is controlled by the analog digital switch matrix 109 to interact with at least one of the peripheral units 1003.

In an exemplary embodiment, the hardware interpreter 108 uses the law of physics i.e. smart by nature. The nanoCloud processor 10 requires no programming of the instruction. For exemplary purpose, if the pulser result is 2, the switch-on output 7, then, the pulser result addresses the $2^{nd}$ register 106b, which contains the output number 7. Then, the interpreter 108 links the output number 7 direct to the analog digital switch matrix 109 which switches on the output 7. The output number 7 refers to the one of the peripheral unit 1003 connected to the external I/O 113.

The floating electrode 102 closes the circuit by capacitive coupling to the ground. The hardware interpreter 108 creates an inherent artificial relation to determine the changes on the object by analyzing combinations of the routing instructions and the value stored in the register with the change in the electric field level.

Furthermore, the hardware interpreter 108 uses successive approximation to command the sequencing circuit to detect the level and timing of dynamic changes in the electric charges on the object. The hardware interpreter 108 then sends the processed digital result to the bi-directional communication unit 104. The bi-directional communication unit 104 then sends the digital result to the hub 20.

In another preferred embodiment of the present invention, the nanoCloud processor 10 also includes a compartment pit 114 for receiving the object 1001 for analyzing at least one of the bio-chemical or physical or chemical properties under the control of the hardware interpreter 108. In a preferred embodiment of the present invention, an embedded element (e.g. bacterium, cell molecules, etc.) in the compartment pit 114 may also be used by hardware interpreter 108 to make behavior-depending decisions. The decisions are then stored in the registers 106 and further are communicated to the communication device 1005 via the hub 20.

In another preferred embodiment of the present invention, the nanoCloud processor 10 furthers includes a push electrode 112 for providing shield to the floating electrode 102 to create a greater energy delta for the energy convertor 103. Further, the nanoCloud processor 10 includes an analog buffer 110 for operating the push electrode 112; and a switch 111 to switch the push electrode 112 to at least one of the analog buffer 110, or the circuit ground. In another preferred embodiment, the switch 111 activates connected peripherals, when the coupling electrode 101 is out of reach of the hub 20 to receive the power (out of reach of e-field).

Figure 2:
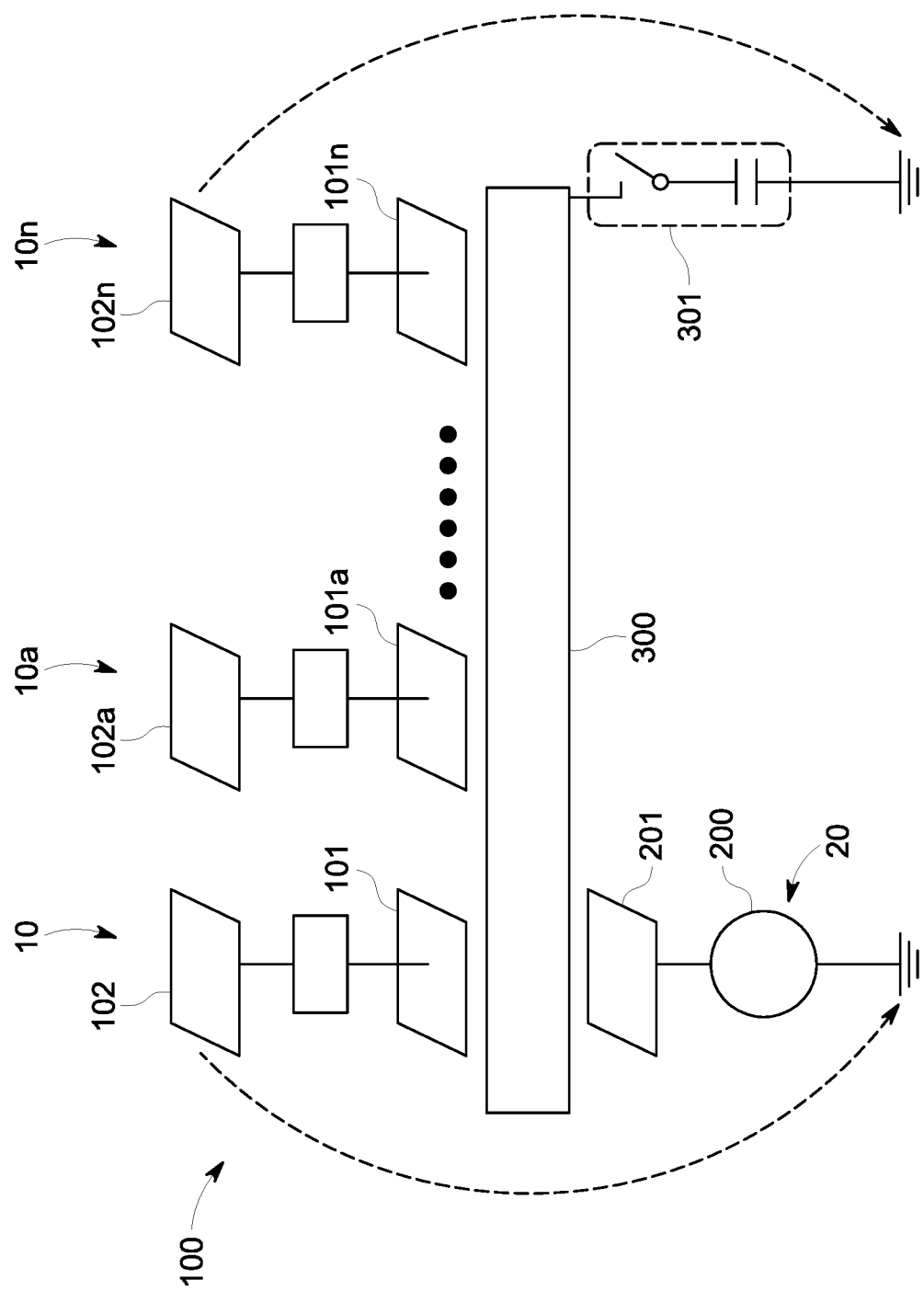
FIG. 2 illustrates a schematic diagram showing of a system having plurality of nanoCloud processors coupled via a medium to an alternating charges emitting field from the hub.

FIG. 2 illustrates a schematic diagram showing of a system 100 having plurality of nanoCloud processors 10, 10*a*, and 10*n* coupled via a medium 300 to an alternating charges emitting field from the hub 20. In a preferred embodiment of the present invention, the hub 20 includes a generator 200 for generating variable frequency, and at least one electrode 201 for emitting alternating charges caused by the received frequency from the generator 200 into the medium 300.

An example of the medium 300 includes, but is not limited to: conductive, non-conductive (dielectric), gas (like air), liquids, steady matter etc. The coupling electrodes 101, 101*a*-101*n* of plurality of nanoCloud processors 10, 10*a*-10*n* couples together over the medium 300 and mirror the electric charges from the hub's electrode 201.

The other sub-circuits of each of the nanoCloud processors 10, 10*a*-10*n* are powered and clocked by the received alternating charges which float back against earth, over the floating electrodes 102, 102*a*-102*n*. In another preferred embodiment of the present invention, the medium 300 is further connected to the ground via sub-circuit 301 to generate a dielectric ruler and emulates a larger distance for the coupling electrode 101*n* than 101*a* or 101.

This allows the nanoCloud processors 10, 10*a*-10*n* to create capacitive coupling with different field strengths to create different position related signals. In another preferred embodiment of the present invention, the system 100 further includes a sub-circuit 301 having a switch for changing impedance on the nanoCloud processors 10, 10*a* . . . 10*n*.

If the medium 300 is held homogenous and the sub-circuit 301 is open i.e. high impedance, then all the nanoCloud processors 10, 10*a*-10*n* are in range to get the same field strength. The medium 300 is connected to the ground when the sub-circuit 301 is closed for low impedance. In case of closed sub-circuit 301 the electric field strength is inversely proportional to the distance between each of the nanoCloud processors 10, 10*a*-10*n* and the hub electrode 201.

Figure 3:
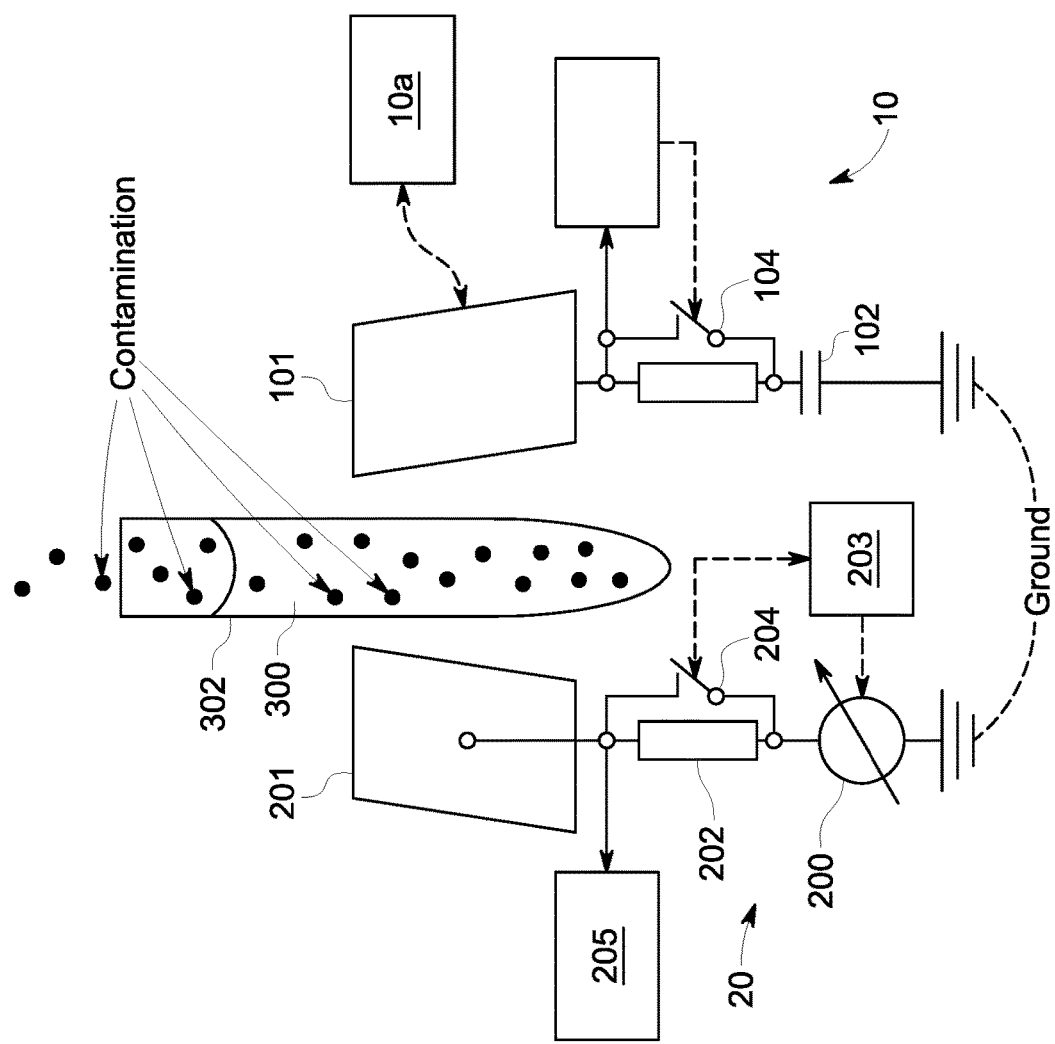
FIG. 3 illustrates another schematic diagram for showing the principle of sensing situation when the medium between the coupling electrode and the floating electrode changes by contamination in the medium P stored in a container.

FIG. 3 illustrates another schematic diagram for showing the principle of sensing situation when the medium between the coupling electrode 101 and the floating electrode 102 changes by contamination in the medium P 300 stored in a container 302.

The nanoCloud processors 10 and 10*a* are "smart-by-nature." Here, they are called Inherent Artificial Intelligence (IAI). The hub 20 gives instruction into at least one of the nanoCloud processors 10 and 10*a* through the electronic switch 204. The open electronic switch 204 lowers the emitting charges level from the hub's electrode 201. The logic 1 has a higher level and a logic 0 has a lower level (e.g. 30% lower).

This represents a kind of AM-modulation (e.g. On/Off Keying (OOK). As the frequency of the hub generator 200 may be changed, the hub 20 is also able to perform frequency modulation including FM modulation, PCM, FSK, or other useful modulations. It would be readily apparent to those skilled in the art that hub 20 may produce other modulations without deviating from the scope of the present invention.

The contamination affects the field which further changes the value of the impedance 202. which is sent to the transceiver unit 205 to be processed by communication devices (1005, shown in FIG. 1). The process of determining the change in impedance is shown and explained in detail in conjunction with FIG. 1 and FIG. 2 of the present invention. The process of detecting contamination is known "impedance spectroscopy," which the present invention performs in a preferred embodiment.

Figure 4:
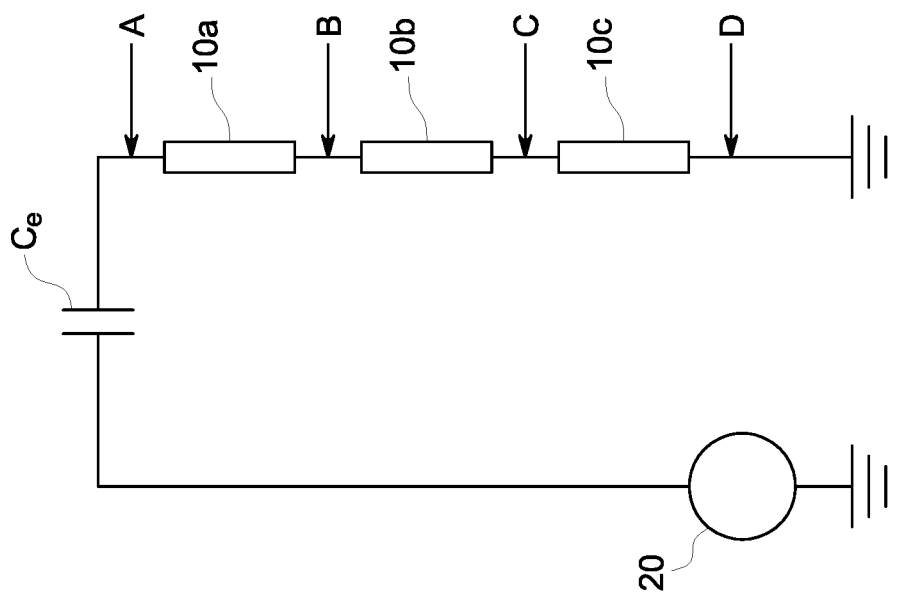
FIG. 4 shows the plurality of the nanoCloud processors to determine the ID number relative to the distance from the hub as a part of the Inherent Artificial Intelligence (IAI) sub-circuit.

FIG. 4 shows the plurality of nanoCloud processors 10 to determine ID number relative to their distance from the hub 20 as a part of the Inherent Artificial Intelligence (IAI) sub-circuit. The nanoCloud processors 10 such as 10*a*, 10*b*, and 10*c* are connected to the hub 20 over the coupling element $C_e$. In an exemplary embodiment, the nanoClould processors 10 and the hub 20 create impedances such as 4.100, 4.100*a*, 4.100*b* in a series connected to the ground.

The voltage difference between A-B, B-C and C-D is the same, while the voltage level between A to ground B to ground and C to ground divides on each stage from the third. The nanoCloud processor 10*a*, 10*b*, 10*c* uses the voltage in the impedance rectified to operate all included sub-functions.

The built-in sensing sub-circuits of each nanoCloud processor 10*a*, 10*b*, and 10*c* uses the field level against ground to create a value for calculating an ID number to communicate with the hub 20. For exemplary purposes, if the nanoCloud processor 10*a* changes its impedance than the change effects all other impedance levels of other nanoCloud processors 10*b* and 10*c*.

Thus, not only can the nearest nanoCloud processor 10*c* communicate with the hub 20, but also the other nanoCloud processor 10*b* and 10*a* in reach, communicates with the hub 20, influenced by alternating charges. This allows determining of the location and signals transmitted from each nano-Cloud processor 10*a*, 10*b*, 10*c*.

Figure 5:
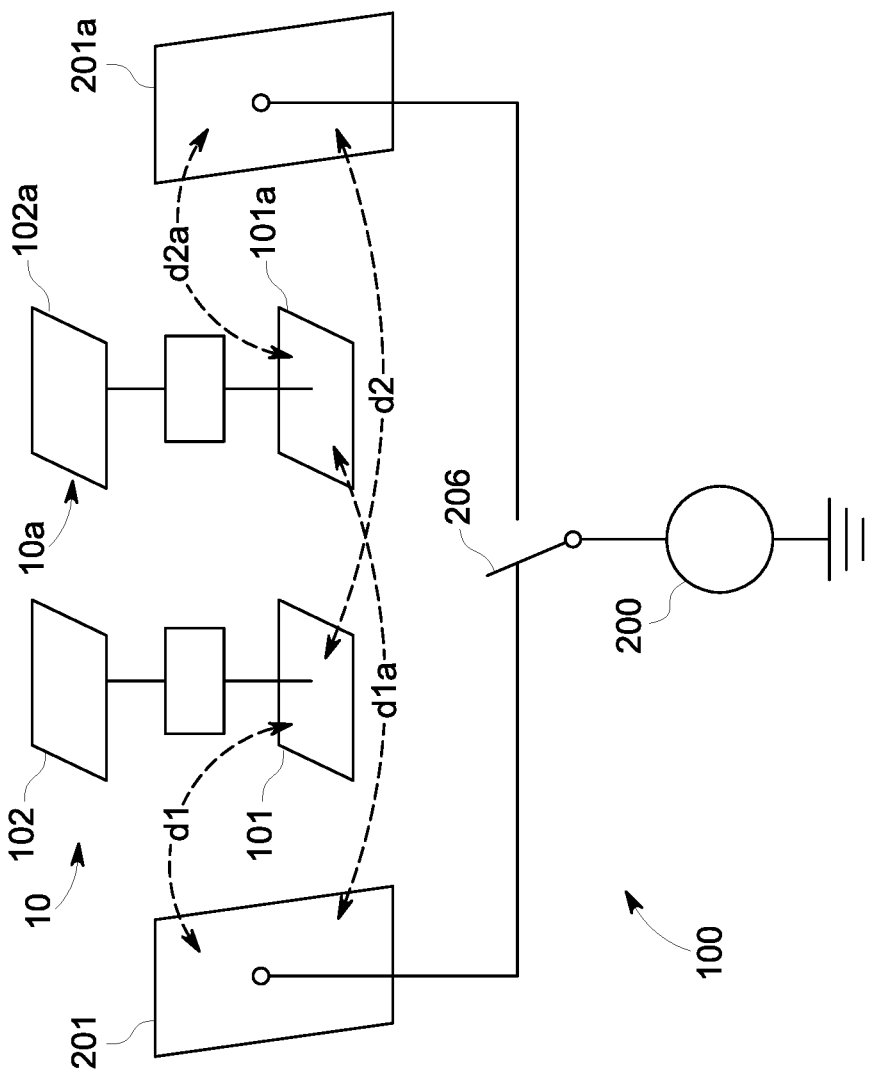
FIG. 5 illustrates another schematic diagram of coupling of hub's electrodes and with the nanoCloud processors causing self-organizing features.

FIG. 5 illustrates another schematic diagram of coupling of hub's electrodes 201 and 201*a* with the nanoCloud processors 10 and 10*a*, causing self-organizing features. The nanoCloud processors 10 and 10*a* are in reach of the resulting alternative charges while the distance to the emitting electrodes 201 and 201*a* varies. Further, the system 100 includes an electronic switch 206 for connecting the emitting electrodes 201, 201*a* to the hub's generator 200.

For exemplary purposes as shown in FIG. 5, the distance of the coupling electrode 101 of the nanoCloud processor 10 is d1 to the hub electrode 201 and is d2 to the electrode 201*a*. Similarly, the distance of the coupling electrode 101*a* from the nanoCloud processor 10*a* is d1*a* to the electrode 201 and is d2*a* to the electrode 201*a*.

Each nanoCloud processor 10 to 10*a* has two values (ID numbers), according to the distance between two hub electrodes 201, 201*a*. The sum of the received charges should be the same in all cases. The switch 206 switches the two coupling electrodes 101 and 101a to define more accurate positioning. Preferably, the arrangement of the coupling electrodes 101 and 101a with the hub's electrode 201, 201a is used to monitor items in inventory.

Figure 6:
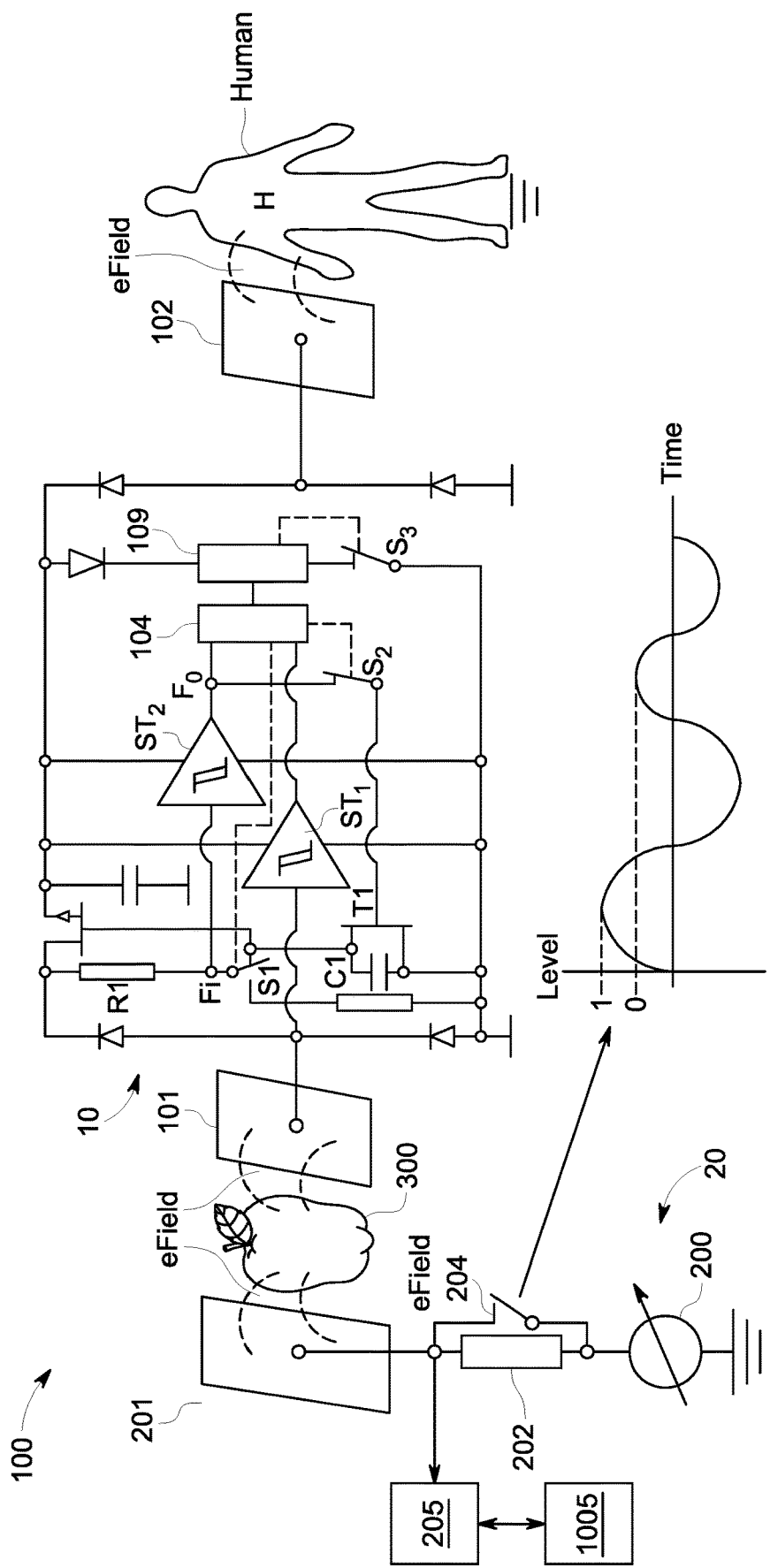
FIG. 6 illustrates a schematic diagram showing electrical field strength on system 100 being approach by a human or changing in the dielectric of the medium P (apple)

FIG. 6 illustrates a schematic diagram showing electrical field strength on the system 100 being approach by a human or changing in the dielectric of the medium P 300 (apple). The human approaches the floating electrode 102. The generator 200 creates a variable frequency (For example 100 KHz to 10 MHz). The frequency is generated over the impedance 202 through the switch 204.

The frequency creates alternating charges on the hub's electrode 201. The charges influence the medium P 300. In an exemplary embodiment of the present invention, the medium P 300 is a food product like an apple. The coupling electrode 102 floats over the approaching human skin to the ground, which creates another voltage level and closes the circuit with the hub 20.

With the measurement of change in electric field, the voltage potential at the medium P 300 is determined at regular intervals of time, thus the quality of the medium P 300 is determined. The connections are capacitive coupled over the electrodes 101 and 102 to form a contactless working system 100 against the medium P 300.

The nanoCloud processor 10 further includes plurality of Schmitt triggers ST1, ST2, wherein the first Schmitt trigger ST1 creates a system clock synchronized with the received charges frequency for operating other sub-circuits of the nanoCloud processor 10. The second Schmitt trigger ST2 creates pulses from the field strength. The temporary measured value of the field strength on the impedance 202 is send to the transceiver unit 205 for further processing by the communicating device 1005. The transceiver unit 205 performs both demodulation and modulation.

A capacitor C1 is charged over a resistor R1 until it reads a threshold for the second Schmitt trigger ST2 and discharges the capacitor C1 over the switch S1 from the analog digital switch matrix 109 and the MOS transistor T1. Therefore, ST1 creates a short pulse once the capacitor C1 is discharged. The nanoClould processor 10 then starts from the beginning which allows the second Schmitt trigger ST2 to create pulses in intervals depending upon the field strength received from 101.

The pulses (105 shown in FIG. 1) operate a counter (105a shown in FIG. 1), which counts the frequency of the e-field during two pulses. The counter (105a shown in FIG. 1) result may be communicated back to the hub 20 via switch S3 and the bi-directional communication unit 104. The counter (105a shown in FIG. 1) creates a load in the circuit having an impact to the electric charges measured directly on the impedance 202.

The hub 20 further includes a transceiver unit 205 for communicating the results received from the nanoCloud processor 10 to the communicating device 1005 and for receiving instructions from the communicating device 1005 to operate the one or more nanoCloud processors 10.

The impact of the electric charges is detected by the transceiver unit 205 of the hub 20. The generator 200 changes the frequency, thus the impedance on the medium P 300 changes related to the frequency and its chemical state. The changes in the frequency over the medium P 300 with respect to the impedance 202 is shown and explained in detail in conjunction with FIG. 7 of the present invention.

The change in the value of impedance 202 at the certain frequency is measured and communicated back to the hub 20, through the transceiver unit 205. The change in the value of the impedance 202 is then further communicated to the communicating device 1005, which is used to analyze and monitor the quality of the medium P 300.

The approaching human brings more ground to the circuit, thus resulting in an increase of the harvested voltage and shorter pulse intervals from the sensing sub-circuit. The harvested voltage is maximum when the human touches the floating electrode 102 at a minimum if the human touches the medium P 300 and bypasses the charges over the skin to the ground.

In another preferred embodiment of the present invention, the multi-sensing is possible with simple and effective methods. As the nanoCloud processor 10 detects approach, touch, bridging or absorption of alternating electric charges direct converting into numbers which address the registers. Thus, the nanoCloud processor 10 acts in smart way just by following physical laws of the digital logic.

The bi-directional unit 104 receives commands/instructions from the hub 20 controlled through the analog digital switch matrix 109. If S1 is set and a hub 20 sends a logic 1 (higher level charges), during the positive period, ST1 triggers to create the system clock synchronized with the charges frequency while ST2 triggers a bit later (e.g. 100 nS) because of higher threshold level.

If the hub 20 sends logic 0, ST1 still trigger but ST2 is below the threshold level which represents logic 0. Together with the clock from ST1 and the represented data on ST2 is shifted into a shift register where a number of bit combinations sent from the hub 20 is received to be operated by the hardware interpreter (108 shown in FIG. 1).

Figure 7:
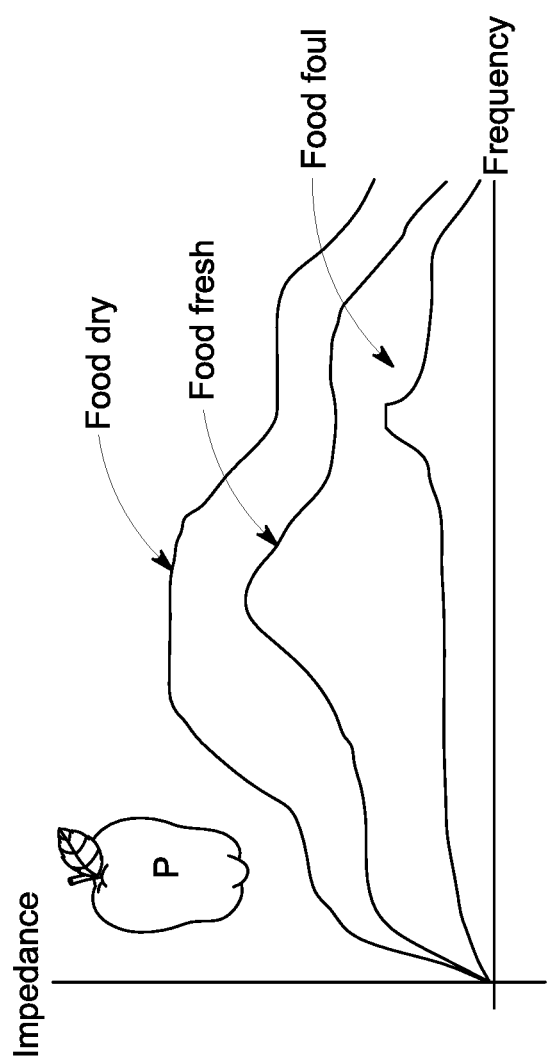
FIG. 7 shows an exemplary impedance and frequency graphical representation of decaying food P over time, in accordance with an exemplary embodiment of the present invention.

FIG. 7 shows an exemplary impedance and frequency graphical representation of decaying food P over time in accordance with an exemplary embodiment of the present invention. Fresh food P has a certain amount of water inside as well as other chemical components, which react with the environment over time. Bread for example dries, which increases the impedance while other food products may spoil from bacterium or fungus, which decreases the impedance. It is also possible to detect germs and their exponential growth, which is monitored at a certain frequency, also known as a field spectrum analyzes.

Figure 8:
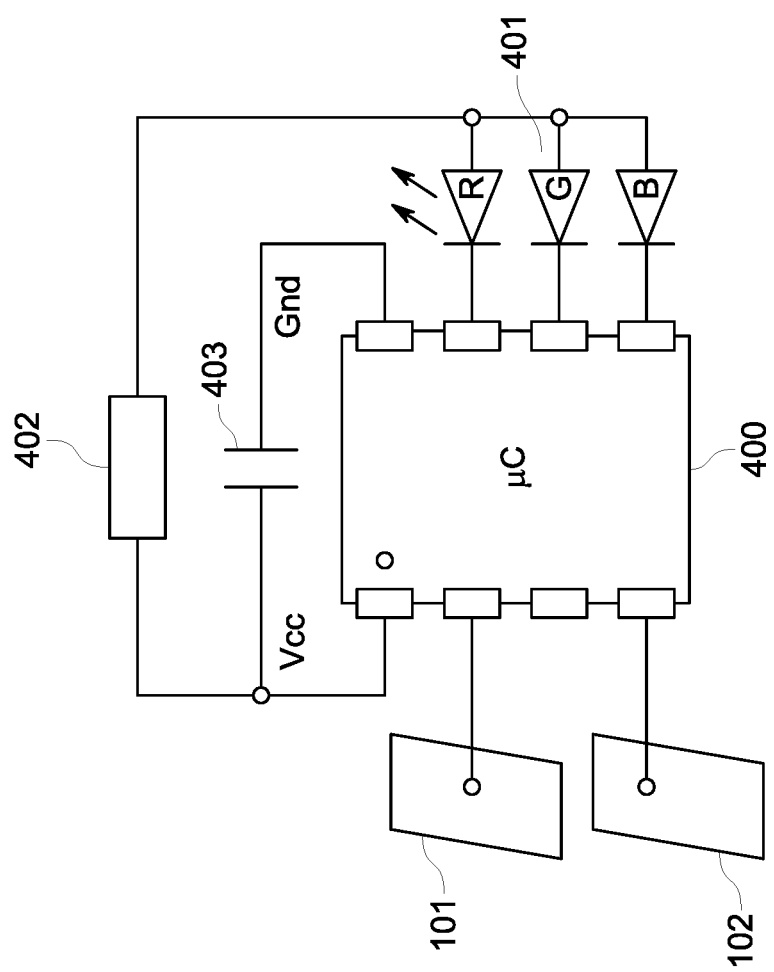
FIG. 8 shows a micro-controller emulating the nanoCloud processor.

FIG. 8 shows a micro-controller 400 emulating the nanoCloud processor. The nanoCloud processor (nCP, as disclosed in FIG. 1 to FIG. 7, of the present invention) is emulated with standard electronic with the disadvantage of utilizing 1000-fold higher power consumption, up to 500 fold higher cost and size. Emulators (micro-controller 400) demonstrate or teach the nCP concept to develop and test other sub-circuits of the nCP without the need of siliconizing, therefore they are in the scope of the invention.

The micro-controller 400 is equipped with coupling electrode 101 and the floating electrode 102 on its inputs and a buffer 403 capacitor between VCC and GND. The coupling electrode 101 mirrors charges from a hub generator (not shown in FIG. 8). The internal ESD diodes of the micro-controller 400 divides the charges in positive and negative half waves and rectify them to the buffer 403, which gets charged (e.g. in 1 ms) to a voltage level where a micro-controller 400 operates.

Once charged, it uses the ESD diodes as clamps against electrostatic discharge, so the chip cannot be destroyed. This is because electrostatic charges are many fold higher than the alternating charges emitted by the hub's electrode (not shown in FIG. 8) over a distance. Instead of a hardware interpreter the micro-controller 400 includes a software interpreter (not shown in FIG. 8) for emulating a nanoCloud processor. For example, micro-controller 400 switches colored LED (RGB) 401 over a resistor 402 from Vcc to ground or driving displays or other peripherals like sensors or actors.

Figure 9:
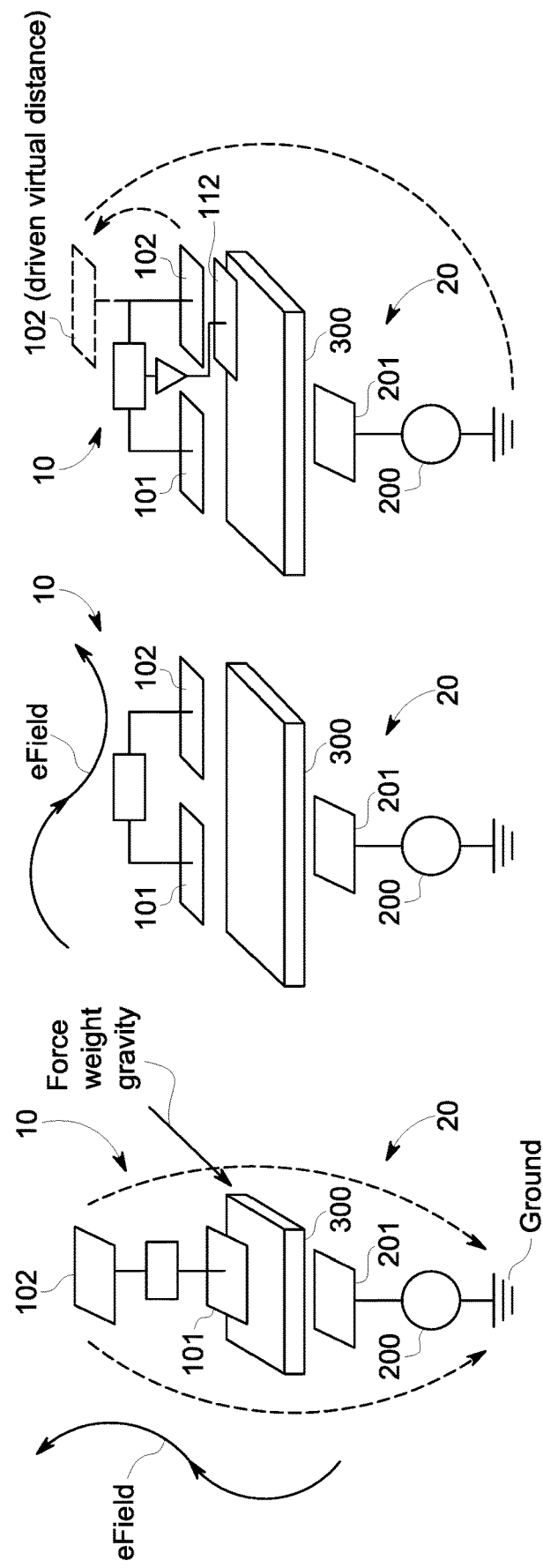
FIG. 9A shows the arrangement wherein the distance of the floating electrode is larger than the distance of coupling electrode from the medium and the hub.
FIG. 9B shows the arrangement wherein the distance of the floating electrode is equidistant from the coupling electrode from the medium and the hub.
FIG. 9C shows the arrangement wherein the distance of the floating electrode is equidistant from the coupling electrode from the medium and the hub in another preferred embodiment of the present invention.

FIG. 9A shows the arrangement wherein the distance of the floating electrode 102 is larger than the distance of coupling electrode 101 from the medium 300 and the hub 20. Thus the impedance of the electric field charges emitted from hub's electrode 201 is more on the coupling electrode 101 than the floating electrode 102.

FIG. 9B shows the arrangement wherein the distance of the floating electrode 102 is equidistant from the coupling electrode 101 from the medium 300 and the hub 20. Thus, the impedance of the electric field charges emitted from the hub's electrode 201 is similar on the coupling electrode 101 and the floating electrode 102.

FIG. 9C shows the arrangement wherein the distance of the floating electrode 102 is equidistant from the coupling electrode 101 from the medium 300 and the hub 20 in another preferred embodiment of the present invention. However, the impedance of electric charges is more on the floating electrode 102 due to presence of the push electrode 112 that forms greater energy delta.

Figure 10:
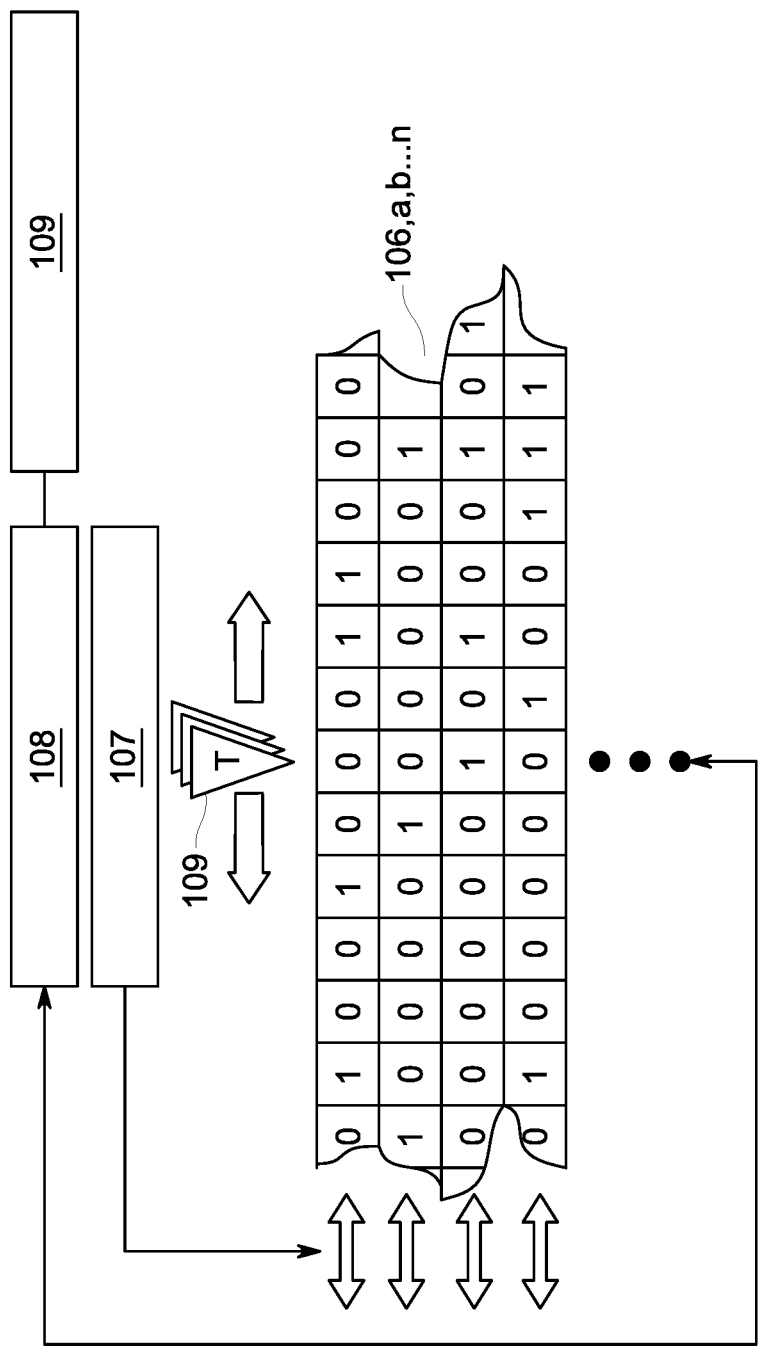
FIG. 10 shows the principle of the interaction between the registers, the analog switch matrix, the hardware interpreter, and the sequencing unit.

FIG. 10 shows the principle of the interaction between the registers 106, 106a-106n, the analog switch matrix 109, the hardware interpreter 108, and the sequencing unit 107. The sequencing unit 107 sequence through the registers in any direction and further performs a jump, if the content in the registers 106a, 106b-106n or a command from the hardware interpreter 108 or the external hub (not shown in FIG. 10) requires such action.

The analog digital switch matrix 109 points specific positions in the register 106, 106a-106n to create a bit combination to form logical operations (AND, OR, NOT). The combinations are interpreted and/or altered from the hardware interpreter 108 and written back to the registers 106, 106a-106n. This process acts like a multi-Turing machine without the disadvantages that multiple streams delay the actions.

Further, the sequencing unit 107 or the analog digital switch matrix 109 performs switching at the speed of a gate (e.g. 5 nano-seconds) to create ultra-fast computing results. The number of registers 106 inside a nanoCloud processor (not shown in FIG. 10) is not limited. Each register 106, 106a, 106b . . . 106n of each nanoCloud processor (10 shown in FIG. 1) works parallel in a highly efficient way of multi-processing, unlike typical micro processor architecture.

Figure 11:
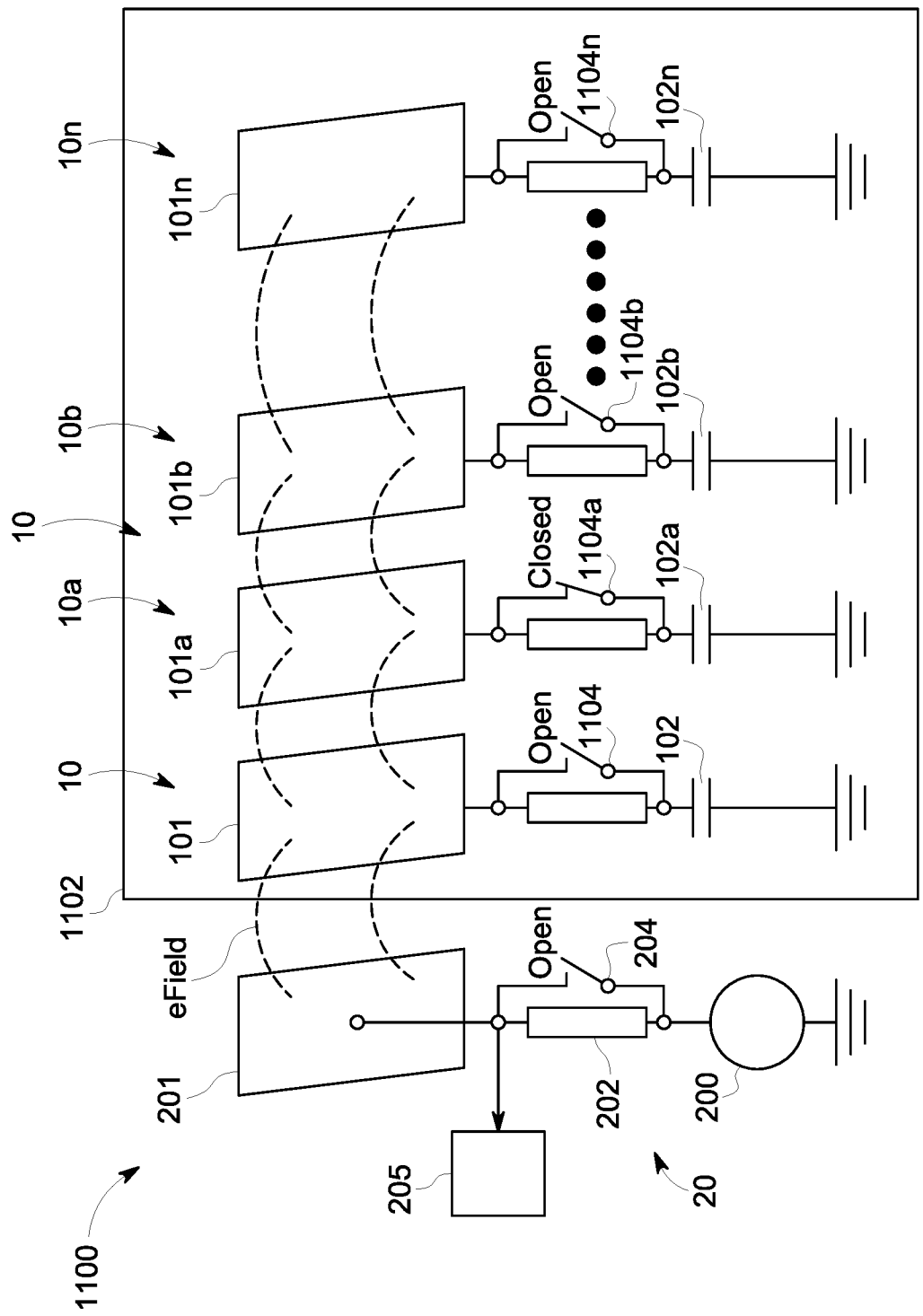
FIG. 11 illustrates a schematic diagram of a system to show plurality of the nanoCloud Processors influenced by an electric field generated from a hub.

FIG. 11 illustrates a schematic diagram of a system 1100 to show the plurality of nanoCloud Processors 10 influenced by an electric field generated from a hub 20. The plurality of nanoCloud processors 10 creates a network of charged coupled devices. In a preferred embodiment of the present invention, the nanoCloud processors 10 are coupled with each other and to the hub 20 via alternating electric charges.

The system 1100 includes plurality of switches 1104, 1104a, 1104b-1104n. The switch 1104a creates lower impedance in the exemplary embodiment explained and shown in FIG. 11. The switches 1104, 1104a, 1104b, and 1104n create a rest impedance of the capacitor that floats over air or a dielectric against ground. Therefore, the switches 104b . . . 104n still get energy and signals even when the switch 104a is closed, as shown in the FIG. 11.

A rhythmically opening and closing of switch 1104 may create a data telegram that creates a modulation on the hub 20 and the nanoCloud processors 10, 10a, 10b-10n. The hub 20 may further bring the signals to the transceiver unit 205. The transceiver unit 205 further demodulates the signal and sends the data into networks or smart devices.

In another preferred embodiment of the present invention, the plurality of nanoCloud processors 10 are integrated in a housing 1102. Example of the housing 1102 include but are not limited to: a chip (stacked in a chip), a wire (electric cable), household items, tape, rubber, products in department stores, or warehouses.

For exemplary purposes, the stacked nanoCloud processors 10 are of big advantages if they are attached to in a stacked object. Examples of the stack object include but not limited to money bills, playing cards, packed products, building blocks, clothes, labels, cloth hangers, and any kind of conveyor belt etc. Further, the dielectric between the hub electrode 201 and the electrodes 101, 102, 101a, 102a-101n, and 102n of the nanoCloud processor 10, 10a, 10b-10n, respectively may be stretched over distance.

Further for exemplary purposes, the nanoCloud processors 10 are wrapped around the insulations to sense physical changes or chemical reactions on an electric wire (housing 102). Similarly, the nanoCloud processors 10 are embedded into dielectric materials. For example, in rubber for tires and seals, polymers and fabrics (for carpets, wearable computing, clothes, bed sheets, etc.) are used to measure alterations in field strength related to or caused from the physical forces or chemical reactions.

Figure 12:
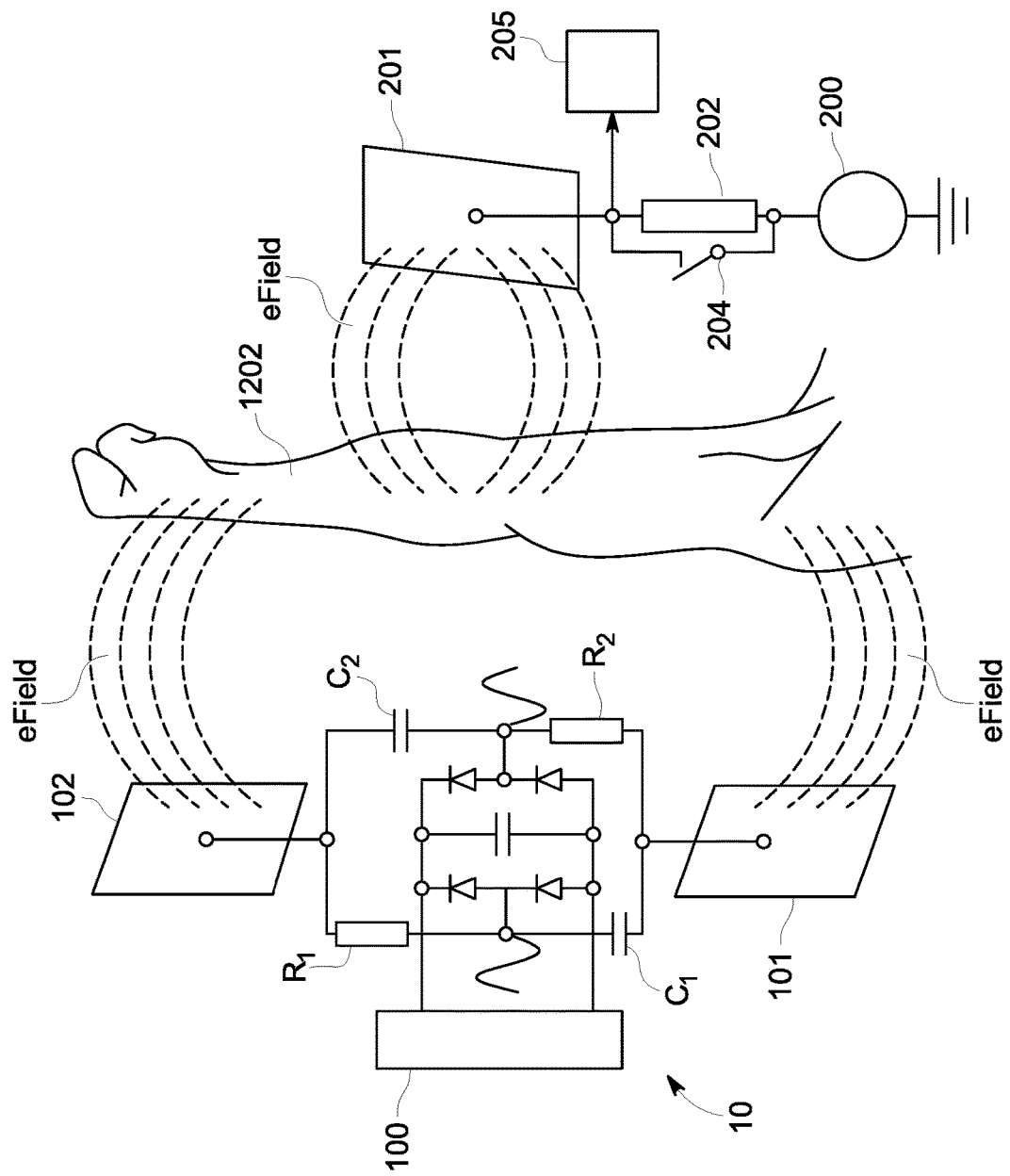
FIG. 12 illustrates a schematic diagram of a nanoCloud processor attached to a living organism and receiving alternating charges from a hub.

FIG. 12 illustrates a schematic diagram of a nanoCloud processor 10 attached to a living organism 1202 and receiving alternating charges from a hub 20. The nanoCloud processor 10 may be attached either on outside or inside of the body as implants. The generator 200 is connected over the impedance 202 and the closed switch 204 for transmitting modulated electric field to the nanoCloud processor 10 over the living organism 1202.

In an exemplary embodiment, the operation of the nanoCloud processor 10 from the electric field emitted from the hub 20 depends upon the orientation of the charges. For exemplary purposes, to increase the field strength, a passive network from R1C1, C2, and R2 are connected before the rectification of the alternating charges and are further used as direct charges for the nanoCloud processor 10.

R1 and C1 create a phase shifter, while C2 and R2 create an inverse phase shifter. The difference between the phases creates a delta efficient enough to charge the buffer B over the diodes and operate the nanoCloud Processor 10. The back modulation of data and sensing events appears as modulation on impedance 202 and further may be amplified, decoded, processed or transmitted in the transceiver unit 205.

In an exemplary embodiment of the present invention, various applications of the nanoCloud Processors (nCP) 10 are as follows:

a) Dielectric Adhesive Tape:

Sensing dielectric adhesive tape is equipped with a stretched electrode and a number of nCPs in a row, which divides the tape into sensing sectors (ID number=Sector number). The dielectric adhesive tape is connected to at least one hub. The dielectric adhesive tape senses changes in the sectors, including approaching, touched, or removed objects and sends the results to the hub.

Such tape is useful (to make shelves interactive to monitor products). A dielectric adhesive tape also may be used to build a grid for a "smart" carpet, which also holds the carpet at its position. The dielectric adhesive tape may be form of fabric, plastic, rubber, or a combination of various materials to transport energy to the attached nCPs from and bi-directional communication with a hub.

Stretching, twisting, or other forces of the tape's material may be used to identify related sensing events, e.g. in clothes, tires ("Smart Rubber"), seats, accessories etc. The nCPs attached to such tape also can illuminate light sources to get attention, or to guide. However those skilled in the art that may envision various applications of the dielectric adhesive tape without deviating from the scope of the present invention.

b) nCP array in a chip:

The compartment pit (114, shown in FIG. 1) may contain biological markers, which turn the invention into a kind of "electronic tongue" to analyze liquids (e.g. water, blood, urine, saliva, sweat etc.) or into an "electronic nose" to detect gases (alcohol, toxins, carbon-based, etc.). In a special version, said nCP array may monitor the behavior of molecules, living cells or micro organism, which in further is always "supervised" by a hub and/or the network behind.

c) nCP array on a chip as a kind of "Super Computer" building a "Charge Coupled Device" (CCD):

A huge number (e.g. 200,000) nCPs may be arranged on a single chip and combine their registers, which from the outside looks like a giant "smart" shift register. Every nCP is responsible for a least one specific task of a mathematically or analytically operation, results may be shared with other nCPs or transmitted to the hub for further processing.

All nCPs are synchronal clocked by the hub's eField frequency, and all their steps happen at the same time interval. A clock frequency of only 100 kHz results in 10 micro seconds step rate. 100.000×200.000 operation steps may be fulfilled in one second, which is 20 Billion. It is apparent that a larger cluster of nCP array chips or higher frequencies may even performance.

It is also necessary to mention that every step sequencer of an nCP has an "one-shot" mode, which triggers the next sequence (step) at the propagation time of the involved gates, which are in the range of nano-seconds. The compartment pit of each nCP may contain "spinning" elements, like quantum bits, qbits, bacterium, nano magnets, and molecules, etc., which act under the influence of polarized electric fields with the nCP involved. The nCP's may further be used to monitor chemical processes.

Unlike modern high frequency clocked Microcontrollers or SOCs, which operate in GHz and easily heat up, nCP arrays not only consume several thousand times less power, but they also do not warm up. Therefore, they have little influence on the elements inside of the compartment pit. A hub reads out or instructs the nCPs inside the array similar to the methods of the so called "Boundary Scan." For those who are skilled in the art may envision various ways of bi-directional communication without deviating from the scope of the present invention.

d) nCP sensor arrays in a location:

A hub's electrode may be taped on shelves, walls, floors, or sealing to power and operate a number of nCPs in reach. A typical situation would be a retail store or a warehouse, where products are equipped with nCPs. This may further be used for inventory purposes or in combination with user action monitoring, for retail/product support.

Once a person (user) reaches out to an nCP equipped product, the related hub may trigger updating, advertising on demand, personalized shopping, dynamic pricing,* or any kind of product monitoring (e.g. preventing shoplifting, spoilage, tampering, leakage, etc.). If a consumer/shopper/worker (user) brings an nCP in reach of a hub (in a customer membership card), the user also may be identified during his action. nCPs may be attached to displays (e.g. eInk, TFT, LCD etc.) to visualize product or user information.

e) nCP for user protection:

It is possible that users have to enter dangerous locations (during work), where body protection is required. Often goggles, gloves, steel enforced shoes, or hard hats must be worn from a worker in a specific situation. The invention allows to "mark" a dangerous zone, (by taping with the invention related tape), which consists of at least one electrode, dielectric material, and with adhesion.

Many protection devices may be equipped with nCPs, which sense the proper use, identify the user and their protection level. The objects (products or tools) a worker has to work with, also may be equipped with nCPs to ensure (and register) that the user is authorized and protected to do the related job. This also protects the company from theft, tampering, sabotage, law suits, accidents, etc. Those who are skilled may envision various uses of nCP without deviating from the scope of the present invention. The behavior of the user is monitored.

In another preferred embodiment of the present invention, the basic elements of Inherent artificial intelligence (IAI) is the ability of objects to act in a smart way or to find smart methods to solve a problem by themselves, unlike Artificial Intelligence (AI), which is based on a programmed computer. The present invention teaches that electronic circuits (further called "nanoCloud Processors or nCPs 10), are configured to be like smart by nature, utilizing routable combinations of sub-circuits depending upon a situation.

The basic elements of Inherent Artificial Intelligence (IAI) are as follows:

a) Awareness: A nCP has a unique identification (ID), which marks the circuit as individual. It is addressable from a hub (Teacher), and also may receive and store a temporary ID (nickname) and/or a group ID. The hub (Teacher) emits an electric field, which powers all nCPs in reach. As the field strength differs from the distance, its measurement "help" the nCPs to determine their position relative to a hub's field emitting electrode. If the hub uses more electrodes places in different angels or distances, the position/location becomes more "clear" for each nCP.

If nCPs are moved, they also realize the dynamic effects from speed, time, and direction. Therefore, "Artificial Awareness" create "Orientation." It is apparent to say that nCPs "listen" to all aspects of a provided electric field (from a hub), its alterations, its changes in strength (caused by changes impedances, absorption, or bridging, resonances, data modulation, etc.).

The electric field is also the source of power for all nCPs in reach, which they have to share, and its frequency clocks their internal operation synchronized. nCPs closer to a hub's field emitting electrode are "stronger" (because the field weakens over distance) than the ones more far away, which creates a "hierarchy" among the nCPs. They communicate with a hub (teacher) depending on their position, avoiding collisions with this kind of clear "ranking."

b) Understanding by mirroring:

Electrodes mirror electrical charges, also known as "capacitive coupling." The medium between an electric field emitting and a mirroring electrode is called dielectric (which can be gas, liquids, steady matter in any combination), and is thus marked by its impedances and or resonance(s) at certain field frequencies.

Mirroring is a passive act and allows an nCP to detect the nature of the dielectric, especially if it changes over time. nCPs can determine and interpret periodically changes as "data," caused by the hub (Teacher), an oscillating cell, or bacterium (which grows exponentially) in its compartment pit. Slower changes on floating electrodes tell the approach of a dynamic object, e.g. a user's hand. Changes in the dielectric's impedance over time indicate leakage, or spoilage, mirrored by the nCP's coupling electrode.

c) Feeling:

To describe the changes of a medium over time, the art generally teaches two methods: quantitative (by numbers) or qualitative (by comparisons). The nCP internal field strength meter sub-circuit realizes both at the same time, utilizing a pulser and a counter, which interact with each other. The counter is clocked from the eField frequency, while the pulser creates pulses in intervals depending on the efield strength.

Every measurement offers two results: the number of counts during two pulses and the number of pulses during certain counts. Both results address register, which contains routing and/or interpreter instructions. For example: a user's hand moves between a hub's emitting and at least one nCP's coupling and floating electrode as a gesture.

The pulser measures the changes in the eField with the help of the counter, while the interpreter uses the addressed registers to interpret the gesture and converts it into a numeric list sent to the hub, which then identifies the gesture in a simple look up table. No external sensors are involved in this process, because of the nCP's internal "feeling" sub circuit.

d) Learning by doing:

Learning is storing and using information, as well as the methods to get the information. nCPs IAI Interpreter orders the Analog Digital Switch matrix (ADS) to connect temporarily with various internal sub circuits, as well as with the real world via the I/O lines to find the cause, dynamics and intensity of changes, mirrored by the electric field.

The pulser and counter store the measured values in the register bank, and a sequencer "combs" through the registers controlled by the interpreter, which re-routes the ADS. The external hub also may store data in selectable registers, which is processed (or tentatively altered) by the interpreter, if the pulser or counter point to them (e.g. during an event) or if the sequencer steps into. This creates both, a short-term and a long-term memory. The degree of artificial intelligence (AIQ) may be initially "taught" by the hub (Teacher).

e) "Successive Approximation":

Successive approximation supports the Interpreter to find the "center of a cause" in just a few steps. Comparable with Analog Digital Converters or search algorithms of databases, the Interpreter selects a method, whose result matches the measurements. Therefore, it combines successive approximation with ADS routing to find the "best way through a maze" (similar iterative or recursive systems include Lee algorithm, with the exception that the number of steps is restricted not to operate in an endless loop).

f) "Socializing" with other nCPs:

A single nCP could be seen as a single cell organism (e.g. Amoeba) and therefore restricted in its intelligence and possibilities. Combining features allows dividing of orders into tasks, so nCPs may temporarily join to solve challenges. They may communicate with each other, supervised by the hub (Teacher). Like other CCD devices, e.g. a camera chip, a single unit (e.g. pixel) only may handle a few aspects of an "image" (e.g. color, intensity), while the whole chip may deliver not only the picture but also histograms, holistic analyzing results, etc. nCPs work together on the chip, as well as with other nCPs in reach of their "own" or remote hubs. nCP's may build "classes" with other nCP's in range to work together to solve problems.

g) "Logic & Conclusions":

Allan Turing taught general theories about processing data methodically. His "Turing machine" is based on a theoretical step sequencer and an interpreter, which could solve any given problem. The core of an nCP is comparable to a multi-Turing machine (MTM), with the important exception that the Art only teaches MTM, which extremely multiply the operating time, as of any use.

The present invention overcomes this issue by a) Clocking all nCPs, their steps and registers parallel synchronized, b) Allowing "one-shot" based sequencer stepping at gate propagation speed (therefore e.g. a calculation is ready before the next system clock step, and c) The non-linear stepping (jumps) of the sequencer. The logical structure in an nCP interprets the shifts of the registers as an operation of the "AND" family (AND, NAND etc.), while the registers represent an "OR" structure (OR, NOR, EXOR etc.).

The pulser as well as Objects in the compartment may deliver a) Random signals, b) Reference signals, c) Periodical signals and d) Register address values. Like in any logical network, there are inputs (terms reduced to bits) and outputs (which deliver the conclusions), also known as combinatory logic (Schoenfinkel et al). In case of the present invention, the combinations may be routed by the ADS, and the conclusions may be feed back into the registers. Software is replaced with hardware, nCPs don't need internal programming and can forgo RAM and ROM.

h) "Teacher-Student":

After start-up, any nCP (Student) is inexperienced, but "aware" that a hub (Teacher) is present. It "registers" with its unique ID and receives a temporarily ID (nickname, TID) from the hub (Teacher). The nCP creates a "smartTalk&Listen slot" (TID×Offset [counter result]), and starts measuring the eField strength.

All nCPs in an array then wait for a "Sync" signal from the hub (Teacher) or addressed commands (ExOps). The hub (Teacher) may "talk" to a single nCP, a group of nCPs (class), or to all of them. The hub "teaches" some basic parameters and the nCPs (Students) start their "experiments" and deliver the results back to the hub. nCPs (Students) may have experiment materials in their compartments.

Example for Such Experiment

Teacher (hub) to all Students (nCPs): "The Cell (Z) in your compartment (C) oscillates (f) between 0.3 and 5 Hz typically". The coded version may e.g. look like: ZCf(0.3-5) Students (nCPs) answer: (with TID and Payload) nCP1: –nCP2:4T nCP3:6N.

nCP1's compartment was empty;
nCP2 reported 4 Hz (quantitative) and "T" for "typically" (qualitative);
ncP3's result is out of the range, so the conclusion was "N" for "nontypically"

Many changes, modifications, variations and other uses and applications of the subject invention will, however, become apparent to those skilled in the art after considering this specification and the accompanying drawings, which discloses the preferred embodiments thereof. All such changes, modifications, variations and other uses and applications which do not depart from the spirit and scope of the invention are deemed to be covered by the invention, which is to be limited only by the claims which follow.

The invention claimed is:

1. A contactless powered and operated self-organizing sensing co-processor system for interacting with an object and one or more peripheral units, further the system communicates with a communicating device over a communication network, the system comprising:
- a hub for providing a modulated alternating electric field of variable frequency and further releasing routing instructions and further communicates data with the communicating device; and
- one or more nanoCloud processors, wherein at least one of the one or more nanoCloud processors interacts with the object and the hub, the nanoCloud processor comprising:
  - a coupling electrode for receiving the alternating electric field from the hub;
  - an energy convertor for converting the alternating electric field into DC power and further extracting clock signals synchronized with the alternating electric field frequency;
  - a bi-directional communication unit communicates digital results from the nanoCloudProcessor to the hub;
  - a pulser to measure field strength of the received alternating electric field from the energy convertor and generates pulsed intervals depending upon the field strength;
  - a counter to count periods of the receiving alternating electric field between two pulses as quantitative measurement and further the counter counts the pulses during a number of continuous counts as qualitative measurement;
  - a plurality of registers, wherein at least one of the registers stores corresponding count received from the counter, further the registers receive bit combination information from the hub, wherein the bit combination information are digital commands sent by the hub by modulating the alternating electric field;
  - a hardware interpreter processes the bit combination information stored in the registers;
  - a sequencing circuit addresses a specific register on the conditions set by at least one of the hub; the pulser; the counter; or the hardware interpreter;
  - a switch matrix under the control of the hardware interpreter receives routing instructions from the hub for making conditional temporary electrical connections with at least one sub-circuit of the nanoCloud processor and the object;
  - a floating electrode coupled to the coupling electrode by capacitive coupling to earth's ground;
  - wherein the hardware interpreter determines changes on the object by analyzing combinations of the routing instructions and the count stored in the register with change in the alternating electric field level; and
  - further wherein the hardware interpreter uses successive approximation on the analyzed combinations to command the sequencing circuit on detecting level and timing of dynamic changes in the alternating electric field on the object, and the hardware interpreter sends the digital results to the bi-directional communication unit.

2. The system according to claim 1 further comprising a compartment pit configured in the nanoCloud processor for receiving the object for analyzing at least one of biochemical; physical; and chemical properties under the control of the hardware interpreter.

3. The system according to claim 1 wherein the register further stores an amount of pulses from the pulser during a certain amount of counts and further stores the number of counts between one pulse interval.

4. The system according to claim 1 wherein the nanoCloud processor further comprising a push electrode for providing shield to the floating electrode to create greater energy delta for the energy convertor.

5. The system according to claim 4 wherein the nanoCloud processor further comprising an analog buffer for operating the push electrode.

6. The system according to claim 5 wherein the nanoCloud processor further comprising a switch unit to switch the push electrode to at least one of the analog buffer; and the circuit ground.

7. The system according to claim 1 wherein the hub comprising:
- a generator for generating the variable frequency; and
- at least one hub electrode for emitting alternating charges caused by the variable frequency from the generator and further mirrors the alternating charges with the coupling electrode.

8. The system according to claim 7 wherein the coupling electrode of each nanoCloud processor in an array couples with each other over the object by mirroring alternating charges received from the hub, further the alternating charges couple back against the earth's ground over the floating electrode of at least one of the nanoCloud processors.

9. The system according to claim 7 wherein the electric field strength is inversely proportional to the distance between each of the nanoCloud processors and the hub electrode.

10. The system according to claim 8 wherein the hardware interpreter of each nanoCloud processor allots an identification number based upon the distance from the hub electrode, and the register of each nanoCloud processor stores the identification number for determining the position of each nanoCloud processor from the hub.

11. The system according to claim 7 wherein the hub further comprising a transceiver unit for communicating the results received from the nanoCloud processor to the communicating device, further the transceiver unit receives instructions from the communicating device to operate the one or more nanoCloud processors.

12. The system according to claim 7 wherein the hub further comprising impedance for measuring the electric charges on the nanoCloud processor.

13. The system according to claim 1 wherein the nanoCloud processor further comprising a plurality of Schmitt triggers, wherein a first Schmitt-trigger creates a system clock synchronized with the received alternating electric field frequency for operating other sub-circuits of the nanoCloud processor; and a second Schmitt-trigger creates pulses from the alternating electric field strength.

14. The system according to claim 13 wherein the second Schmitt trigger decodes data from the modulated alternating electric field under the control of the switch matrix for receiving the bit combination information from the hub.

15. The system according to claim 1 wherein the hardware interpreter processes the value and the trend of the electric field strength on the object.

16. The system according to claim 1 further comprising a nano-coated material coating on the coupling electrode and the floating electrode for detecting and eliminating germs and pathogens, further the nano-coated material measures electro chemical reactions.

17. The system according to claim 1 wherein the energy convertor connects to the counter, wherein the counter starts counting when the coupling electrode is out of reach of an electric field.

18. The system according to claim 1 further comprising a housing for stacking a plurality of nanoCloud processors for creating a network of charged coupled devices to sense physical and chemical changes.

19. The system according to claim 1 wherein the nanoCloud processor further comprising at least one external I/O port controlled by the switch matrix to interact with at least one of the peripheral units.

20. A contactless powered and operated self-organizing sensing co-processor system for interacting with an object and one or more peripheral units, further the system communicates with a communicating device over a communication network, the system comprising:

- a hub for providing a modulated alternating electric field of variable frequency and further releasing routing instructions and further communicates data with the communicating device; and
- one or more microcontroller, wherein at least one of the one or more microcontroller interacts with the object and the hub, the microcontroller comprising:
  - a coupling electrode for receiving the alternating electric field from the hub;
  - an energy convertor for converting the alternating electric field into DC power and further converting clock signals synchronized with the alternating electric field frequency;
  - a bi-directional communication unit communicates digital results from the microcontroller to the hub;
  - a pulser to measure field strength of the received alternating electric field from the energy convertor and generates pulsed intervals depending upon the field strength;
  - a counter to count periods of the receiving alternating electric field between two pulses as quantitative measurement and further the counter counts the pulses during a number of continuous counts as qualitative measurement;
  - a plurality of registers, wherein at least one of the register stores the corresponding count received from the counter, further the registers receive bit combination information from the hub, wherein the bit combination information are digital commands sent by the hub by modulating the alternating electric field;
  - a software interpreter processes the bit combination information stored in the registers;
  - a sequencing circuit addresses a specific register on conditions set by at least one of the hub; the pulser; the counter; or the software interpreter;
  - a I/O register under the control of the software interpreter receives routing instructions from the hub for making conditional temporary electrical connections with at least one sub-circuit of the microcontroller and the object;
  - at least one external I/O port controlled by the I/O register to interact with at least one peripheral unit;
  - a floating electrode coupled to the coupling electrode by capacitive coupling the coupling electrode to earth's ground;
- wherein the software interpreter determines changes on the object by analyzing combinations of the routing instructions and the count stored in the register with change in the alternating electric field level; and
- further wherein the software interpreter uses successive approximation of the analyzed combinations to command the sequencing circuit on detecting level and timing of dynamic changes in the alternating electric field on the object, and the software interpreter sends the digital results to the bi-directional communication unit.

* * * * *